(12) United States Patent
Liu et al.

(10) Patent No.: US 6,529,673 B1
(45) Date of Patent: Mar. 4, 2003

(54) MANUAL VARIABLE OPTICAL ATTENUATOR AND METHOD

(75) Inventors: Yongsheng Liu, San Jose, CA (US); Vincent Nguyen, San Jose, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 09/773,854

(22) Filed: Jan. 31, 2001

(51) Int. Cl.[7] .................................................. G02B 6/00
(52) U.S. Cl. ............................ 385/140; 385/16; 385/33
(58) Field of Search ............................ 385/140, 25, 31, 385/33, 47, 16

(56) References Cited

U.S. PATENT DOCUMENTS 4,516,827 A    5/1985   Lance et al.
6,137,941 A  * 10/2000   Robinson ..................... 385/140

\* cited by examiner

*Primary Examiner*—Phan T. H. Palmer

(57) ABSTRACT

An optical variable attenuator having a reflector in a first position, and a mechanical device for positioning the reflector from the first position to a second position is disclosed. The optical variable mechanical device comprises a first and second guide slots, a moving part, and a screw, where a first guide slot is placed parallel to the second guide slot. The moving part is placed in between and extending in the parallel direction to the first and second guide slots, the screw extending into and away from the moving part. Optionally, a lock pin is used to mount a moving part to avoid injecting any tip and tilt errors. The lock pin is guided by two machined slots on a main body of a variable optical attenuator. Alternatively, two springs loaded balls are positioned in tight contact of the guide slots on the move part, instead of a lock pin.

21 Claims, 5 Drawing Sheets

MANUAL VARIABLE OPTICAL ATTENUATOR AND METHOD

BACKGROUND INFORMATION

1. Field of the Invention

The present invention relates generally to the field of optical devices, and particularly a variable optical attenuator.

2. Description of Related Art

Fiber optics transmission is now a common platform for transporting voice, data, and images. As the demand for data carrying capacity continues to increase, optical companies are finding techniques to utilize the bandwidth of existing fiber-optic cable more efficiently. An established technique for increasing the carrying capacity of existing fiber cable is Wavelength Division Multiplexing (WDM) in which multiple information channels are independently transmitted over the same fiber using multiple wavelengths of light. In this practice, each light-wave-propagated information channel corresponds to light within a specific wavelength range or "band".

Due to the increase network traffic resulting from the use of the WDM technique, companies are designing sophisticated optical switching devices which can quickly route numerous channels among various optical communications lines. In these instances, the optical power level of each added or dropped channel has to be controlled. Conventional solutions for optical switching devices use an electronically-controlled variable optical attenuator (VOA) to adjust the power level of optical beam, or use an attenuation filter to block portion of beams via step motor, or use microelectro-mechanical mirrors. A principle shortcoming in a conventional solution is the cost in designing an electronically controlled VOA. Accordingly, the present invention addresses these needs.

SUMMARY OF THE INVENTION

The present invention discloses an optical variable attenuator having a reflector in a first position, and a mechanical device for positioning the reflector from the first position to a second position. The optical variable mechanical device comprises a first and second guide slots, a moving part, and a screw, where a first guide slot is placed parallel to the second guide slot. The moving part is placed in between and extending in the parallel direction to the first and second guide slots, the screw extending into and away from the moving part.

Optionally, a first and second spring loaded lock pins are used to mount a moving part to avoid injecting any tip and tilt errors. The lock pins are guided by two machined slots on a main body of a variable optical attenuator. Alternatively, the two guide slots can be replaced with a pair of precision pins mounted side-by-side. Advantageously, the present invention significantly simplifies the complexity in the adjustment of a variable optical attenuator.

Other structures and methods are disclosed in the detailed description below. This summary does not purport to define the invention. The invention is defined by the claims.

DETAILED DESCRIPTION OF PREFERRED EMBODIMENT(S)

Figure 1:
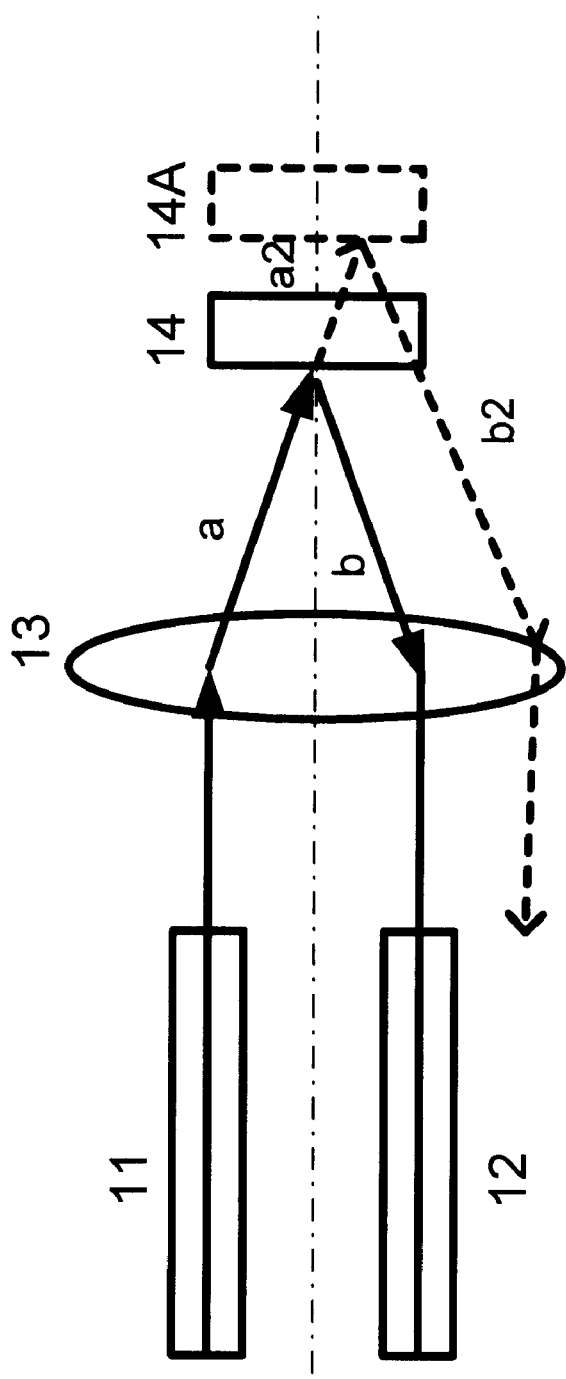
FIG. 1 is a pictorial diagram illustrating a variable optical attenuator in accordance with the present invention.

FIG. 1 is a pictorial diagram illustrating a variable optical attenuator 10 in accordance with the present invention. An incident light from a waveguide 11 is collimated by lens 13 and strikes on a reflector 14. The reflected beam passes through the lens 13 and returns back to a waveguide 12. If the reflector 14 is moved away from original focal position A to position A2, the incident beam into the reflector 14 will result the reflected beam lateral shift from a beam path b to a beam path b2. Thus, certain portion of the light cannot be returned back to the receiving waveguide 12. Therefore, the optical power into the receiving waveguide 12 is attenuated.

Figure 2:
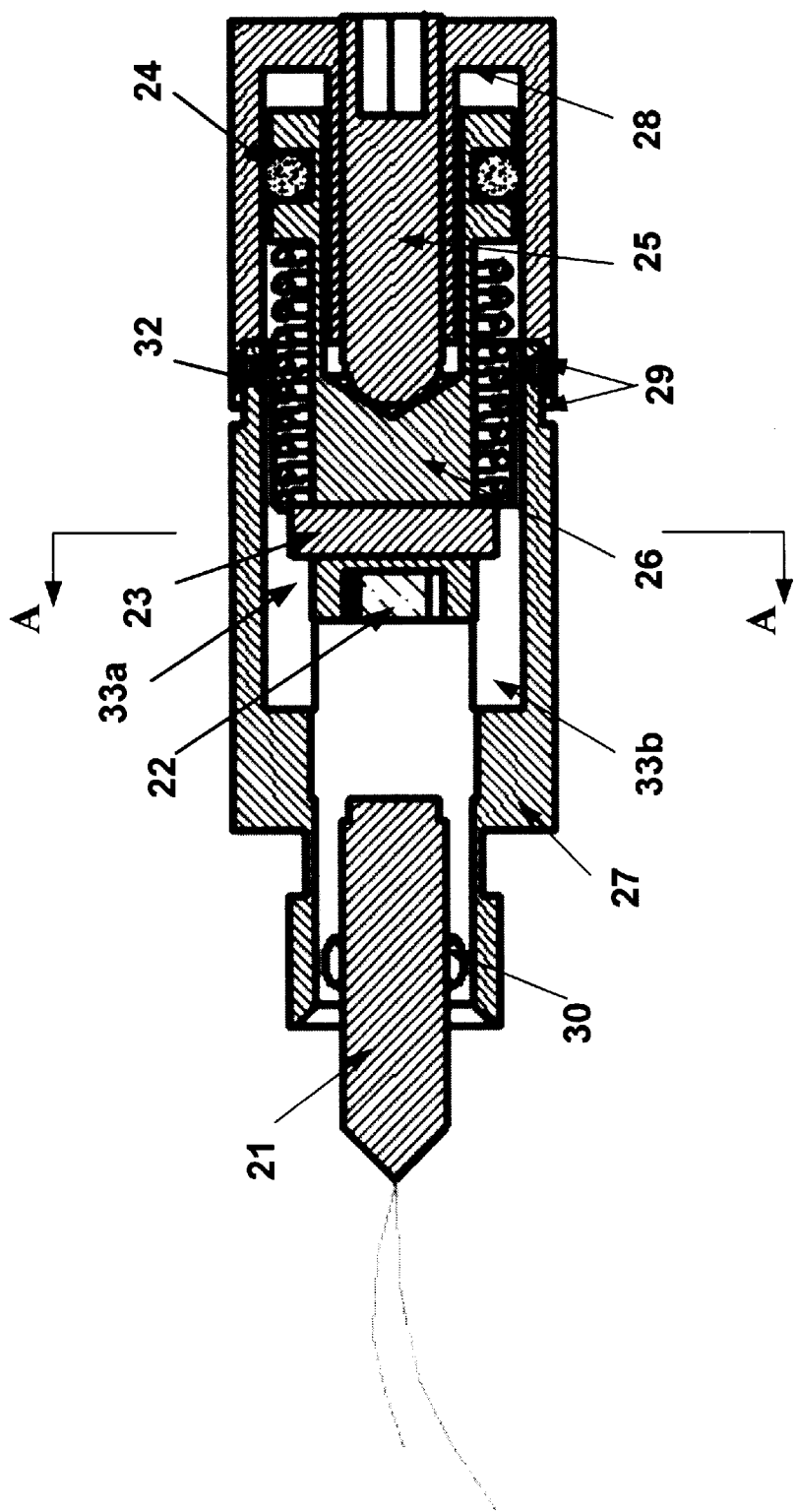
FIG. 2 is a pictorial diagram illustrating a variable optical attenuator in accordance with the present invention.

FIG. 2 is a pictorial diagram illustrating the cross-section of a variable optical attenuator device 20. A dual-fiber collimator 21 is soldered on a main body 27, while a moving screw 25 is mounted on an auxiliary body 28. A reflective mirror 22 is mounted on a moving part 26. The main body 27 and auxiliary body 28 are joined together over the solder area 29.

When the screw 25 is screwed into the auxiliary body 28 at maximum extension, the moving part 26 is pushed toward the collimator 21, and the spring 32 is fully compressed. The mirror position is located at the focal position of the dual-fiber collimator 21. At this situation, the VOA is at minimal attenuation. With the screw 25 is screwed out of the auxiliary body 28, the spring force pushes the moving part 26 away, and consequently, moves the reflective mirror 22 away from the focal position. Therefore, the attenuation is increased. Therefore, by adjusting the position of the screw 25 with respect to the auxiliary body 28, the continuous attenuation is achieved. In order to maintain the continuous variation of the attenuation, the mirror 22 has to move without any tip and tilt error. Two locking pins 23a and 23b are mounted on the moving part 26, and are positioned along the guide slots 33a and 33b.

To keep the VOA apparatus hermetically sealed, an O-ring 31 is mounted on the moving part 26. This structure allows the en-longed path for blocking the moisture from entering the package. At the same time, the movement of the screw 25 is not affected by is this hermetically seal O-ring 31, and still able to freely adjust the position of the mirror 22. It is noted that the spring 32 also provides the forward stop position of the screw 25 to prevent the clashing of the reflector 22 into the collimator 21.

Figure 3:
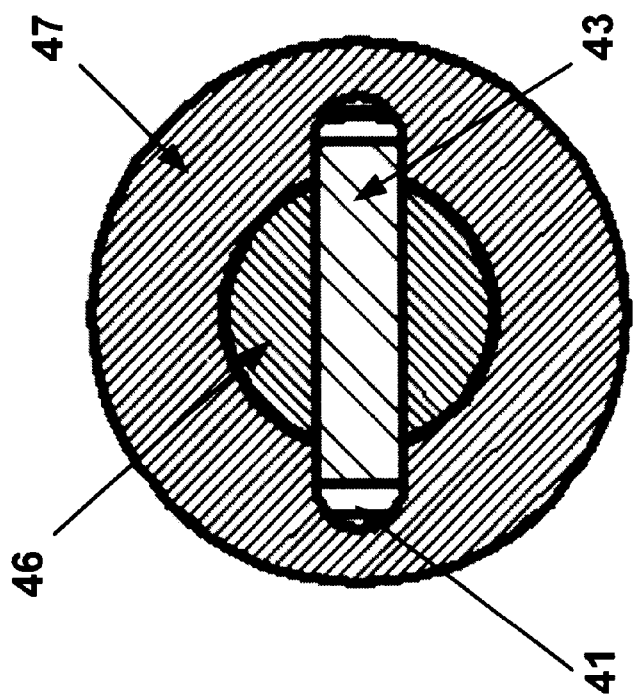
FIG. 3 is a pictorial diagram illustrating one embodiment of a variable optical attenuator with lock pin in accordance with the present invention.

FIG. 3 is a pictorial diagram illustrating one embodiment 30 of a variable optical attenuator apparatus with a lock pin, representing the cross-section of A—A in FIG. 2. An objective of the VOA 20 is that the movement of a moving part 46 does not introduced any tip and tilt errors, as these errors will cause the non-monotonous variation of the attenuation during the adjustment. One embodiment of the VOA 20 uses two lock pins 23a and 23b mounted on the moving part 26, and the pins is guided by the two machined slots 33a and 33b on the main body 27.

Figure 4:
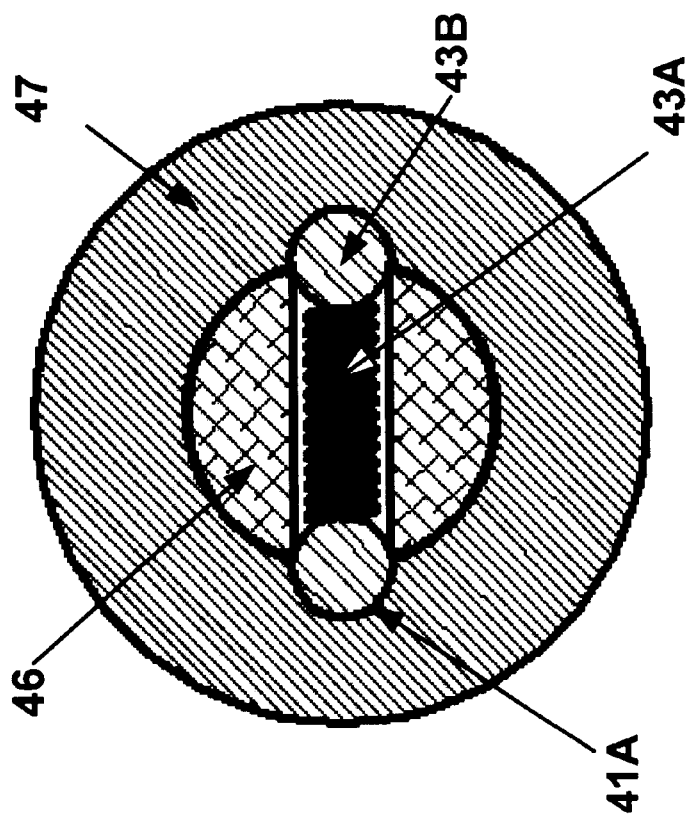
FIG. 4 is a pictorial diagram illustrating another embodiment of a variable optical attenuator that hermetically sealed in accordance with the present invention.

FIG. 4 is a pictorial diagram illustrating another embodiment 40 of a variable optical attenuator that is hermetically sealed. In this embodiment, the movement guide uses two sets of springs loaded balls assembled on the moving part 26 to replace the two sets of lock pins 23*a* and 23*b* shown in FIG. 2. The spring force tightly contacts the two balls 41*a* and 41*b* with the two guide slots on the main body 27. The advantage of using spring balls is to keep the tight contact of the guide slots, and the required machined tolerance of the guide slots 33*a* and 33*b* can also be reduced.

Figure 5:
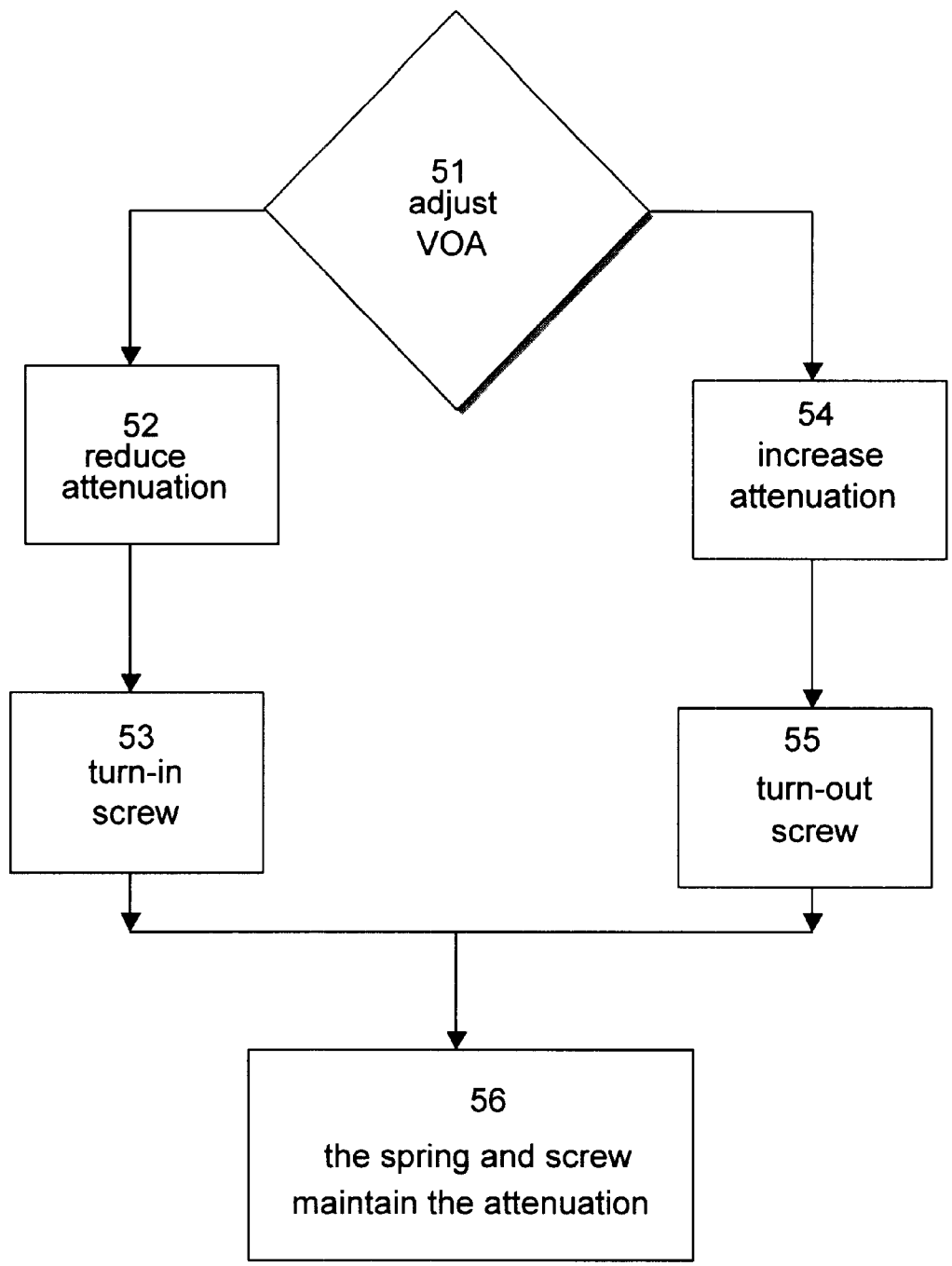
FIG. 5 is a flow diagram illustrating a process in adjusting the variable optical attenuator in accordance with the present invention.

FIG. 5 is a flow diagram illustrating a process 50 in adjusting the variable optical attenuator 20. When the VOA 20 requires adjustment 51, the amount of attenuation will either be adjusted to a lower attenuation or a higher attenuation. On the one hand, the screw 25 is turned inward 53 if the desirable result is to reduce 52 the amount of attenuation. On the other hand, the screw 25 is turned outward 55 if the desirable result is to increase 54 the amount of attenuation. After an appropriate adjustment has been made, the spring 32 and screw 25 maintain the attenuation value in place 56.

The above embodiments are only illustrative of the principles of this invention and are not intended to limit the invention to the particular embodiments described. For example, although a screw is illustrated above in manual adjustment of a VOA, one of ordinary skill in the art should recognize that other similar or equivalent mechanical device may be used to adjust a VOA manually without departing from the spirits of the present invention. Furthermore, a pairs of lock pins and a pair sets of spring balls are intended as illustrations only to mount a moving part. It is apparent to one of ordinary skill in the art that the same or similar mechanism can also be applied to move an optical component shown in FIG. 1, or to move an attenuating object into the optical path illustrated in FIG. 1. Such object can be a blocking piece or a neutral density filter. It is apparent to one of ordinary skill in the art that a similar or equivalent part(s) may be used to mount a moving part on a main body. Accordingly, various modifications, adaptations, and combinations of various features of the described embodiments can be practiced without departing from the scope of the invention as set forth in the appended claims.

We claim:

1. An optical variable attenuator, comprising:
   a reflector having a first position; and
   a mechanical device, coupled to the reflector, for positioning the reflector from the first position to a second position, wherein the orientation of the reflector in the second position is parallel to the orientation of the reflector in the first position.

2. The optical variable attenuator of claim 1, wherein the mechanical device comprises a first and second guide slots, a moving part, and a screw, wherein a first guide slot is parallel to the second guide slot, the moving part being placed in between and extending in the parallel direction to the first and second guide slots, the screw extending into and away from the moving part.

3. The optical variable attenuator of claim 2, further comprising:
   a package; and
   a collimator optically coupled to the reflector, wherein the mechanical device comprises a spring placed between the moving part and the package, the spring preventing the reflector from contacting the collimator during an inward movement of the screw, the spring providing retraction force during an outward movement of the screw.

4. The optical variable attenuator of claim 2, wherein the mechanical device comprises a pair of positioning pins, the positioning pins causing the moving part to move in a certain direction.

5. The optical variable attenuator of claim 2, wherein the mechanical device comprises a pair of spring loaded balls, the pair comprising a first ball on a first end and a second ball on a second end, the first ball being in contact to the first guide slot, the second ball being in contact to the second guide slot.

6. The optical variable attenuator of claim 2, further comprising:
   a package; and
   a collimator optically coupled to the reflector, wherein the mechanical device comprises an O-ring extending between the moving part and the package, the O-ring operating to hermetically seal the reflector and collimators.

7. The optical variable attenuator of claim 1, wherein the first position comprises a focal point of a lens optically coupled to the reflector.

8. A variable optical attenuator, comprising:
   an input fiber emanating a light;
   a reflector reflecting the light;
     an output fiber, parallel to the input fiber, receiving a portion of the reflected light; and
   a mechanical device, coupled to the movable reflector, for moving the movable reflector towards and away from the lens.

9. The variable optical attenuator of claim 8, wherein a collimated light beam is reflected along a first path so as to provide a first attenuation value when the reflector is in a first position, wherein a collimated light beam is reflected along a second path so as to provide a second attenuation value when the reflector is in a second position, wherein the second path is different than and parallel to the first path.

10. The variable optical attenuator of claim 8, wherein the mechanical device comprises a first and second guide slots, a moving part, and a screw, wherein a first guide slot is parallel to the second guide slot, the moving part being placed in between and extending in the parallel direction to the first and second guide slots, the screw extending into and away from the moving part.

11. An optical variable attenuator, comprising:
   a reflector having a first position; and
   a mechanical device, coupled to the reflector, for positioning the reflector from the first position to a second position, wherein the mechanical device comprises a first and second guide slots, a moving part, and a screw, wherein a first guide slot is parallel to the second guide slot, the moving part being placed in between and extending in the parallel direction to the first and second guide slots, the screw extending into and away from the moving part.

12. The optical variable attenuator of claim 11, wherein the mechanical device comprises a pair of positioning pins, the positioning pins causing the moving part to move in a certain direction.

13. The optical variable attenuator of claim 11, wherein the mechanical device comprises a pair of spring loaded balls, the pair comprising a first ball on a first end and a second ball on a second end, the first ball being in contact with the first guide slot, the second ball being in contact with the second guide slot.

14. An optical variable attenuator, comprising:
   a reflector having a first position;
   a collimator;
   a package comprising an auxiliary body; and
   a mechanical device, coupled to the reflector, for positioning the reflector from the first position to a second position, wherein the mechanical device comprises a moving part and an O-ring extending between the moving part and the auxiliary body, the O-ring operating to hermetically seal the reflector and the collimator.

15. An optical variable attenuator, comprising:

a reflector having a first position;

a collimator;

a package comprising an auxiliary body; and a mechanical device, coupled to the reflector, for positioning the reflector from the first position to a second position, wherein the mechanical device comprises a moving part and a spring placed between the moving part and the auxiliary body, the spring preventing the reflector from contacting the collimator during an inward movement of the screw, the spring providing retraction force during an outward movement of the screw.

16. A variable optical attenuator, comprising:

an input fiber emanating a light;

a reflector reflecting the light;

an output fiber receiving a portion of the reflected light;

a lens optically coupled between the movable reflector and the input and output fibers; and a mechanical device, coupled to the movable reflector, for moving the movable reflector towards and away from the lens.

17. The variable optical attenuator of claim 16, wherein a collimated light beam is reflected along a first path so as to provide a first attenuation value when the reflector is in a first position, wherein a collimated light beam is reflected along a second path so as to provide a second attenuation value when the reflector is in a second position, wherein the second path is different than and parallel to the first path.

18. The variable optical attenuator of claim 16, wherein the mechanical device comprises a first and second guide slots, a moving part, and a screw, wherein a first guide slot is parallel to the second guide slot, the moving part being placed in between and extending in the parallel direction to the first and second guide slots, the screw extending into and away from the moving part.

19. A method for adjustment of a variable optical attenuator, comprising:

first, reflecting a collimated light beam along a first path so as to provide a first attenuation value; and second, reflecting a collimated light beam along a second path so as to provide a second attenuation value, wherein the second path is different than and parallel to the first path.

20. The method of claim 19, wherein in the second reflecting step comprises positioning a reflector from a first position to a second position by adjusting a mechanical device.

21. The method of claim 19, wherein in the second reflecting step comprises decreasing the attenuation value of the variable optical attenuator by turning outward a moving part.

* * * * *